UNITED STATES PATENT OFFICE.

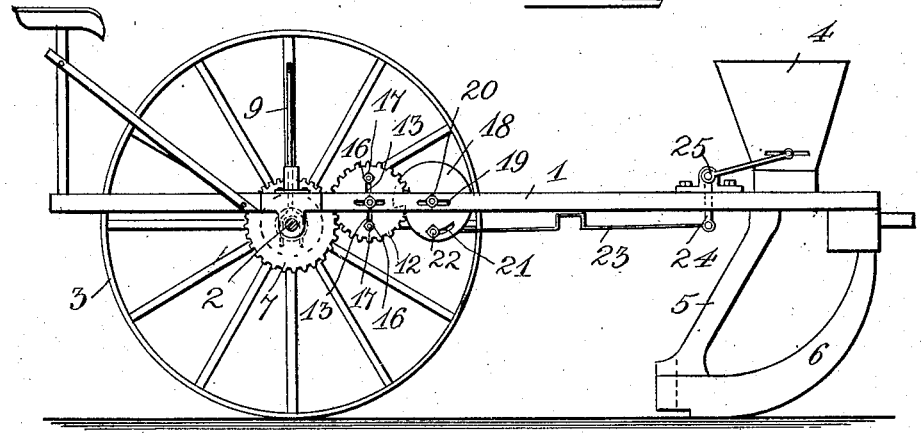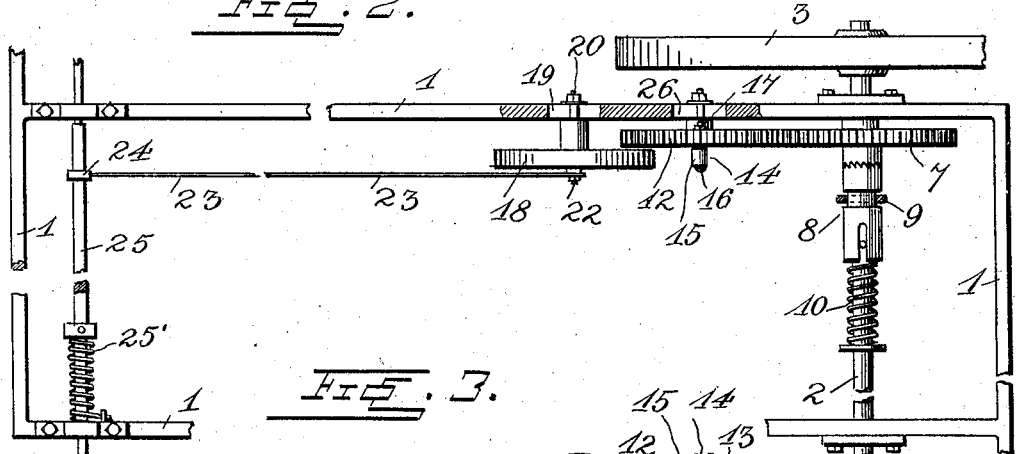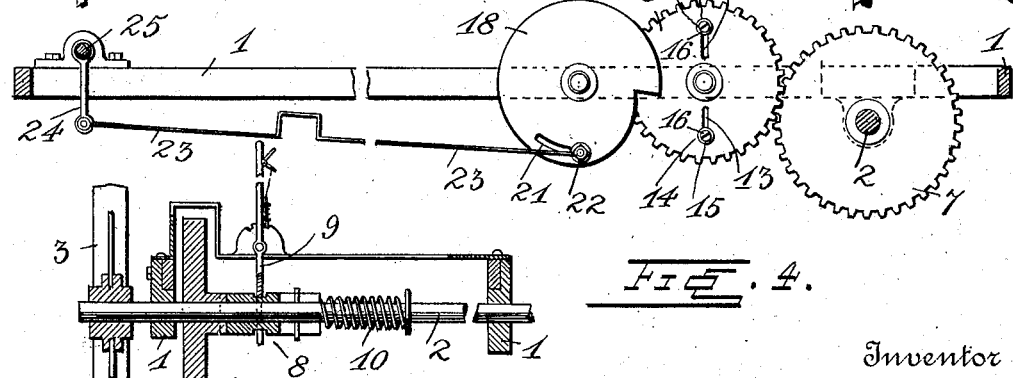

GEORGE W. BRUBAKER, JR., OF LOUDONVILLE, OHIO.

CORN-PLANTER.

No. 800,262.       Specification of Letters Patent.       Patented Sept. 26, 1905.

Application filed March 9, 1905. Serial No. 249,223.

*To all whom it may concern:*

Be it known that I, GEORGE W. BRUBAKER, Jr., a citizen of the United States, residing at Loudonville, in the county of Ashland and State of Ohio, have invented certain new and useful Improvements in Corn-Planters; and I do declare the following to be a full, clear, and exact description of the invention, such as will enable others skilled in the art to which it appertains to make and use the same.

This invention relates to improvements in corn-planters.

The object of the invention is to provide mechanism whereby the discharge-valve in the hoppers will be actuated to drop seed at regular intervals without the necessity of using a cord or wire or a spade-wheel.

Another object is to provide means whereby the operating mechanism may be adjusted and arranged to vary the speed of the same, thereby causing the planter to drop more or less seed and at greater or less distances apart, as may be desired.

A further object is to provide an attachment of this character which will be simple, strong, and durable in construction, convenient, economical, and easily operated, and which may be readily applied to corn-planters now in use.

With these and other objects in view the invention consists of certain novel features of construction, combination, and arrangement of parts, as will be hereinafter described and claimed.

In the accompanying drawings, Figure 1 is a side view of a corn-planter made in accordance with my invention. Fig. 2 is a top plan view of a portion of the planter. Fig. 3 is a vertical sectional view through the planter-frame looking toward the opposite side to that shown in Fig. 1; and Fig. 4 is a detail vertical sectional view taken on a line with the axle of the planter, showing the manner of connecting the drive-wheel of the mechanism to said shaft.

Referring more particularly to the drawings, 1 denotes a planter-frame; 2, the axle; 3, the supporting-wheels; 4, the seed-hoppers; 5, the seed-tube, and 6 the shoe. These parts may be of the usual or any desired construction.

Loosely mounted on the axle 2 is the main drive-gear 7, which is provided with one member of a clutch device 8, the opposing member of which is slidably mounted upon the axle 2 to turn therewith. Loosely connected with the sliding member of the clutch 8 is the lower forked end of a pivotally-mounted shifting-lever 9, the opposite end of which extends to within convenient reach of the operator. On the axle 2 is arranged a spring 10, which bears upon the sliding member of the clutch to yieldingly hold the same in engagement with the gear member, the lever 9 being provided with a pawl-and-rack attachment, whereby the same may be held to lock the sliding member of the clutch in engagement with the gear member against the tension of the spring 10.

Suitably journaled upon the frame of the planter is a spur gear-wheel 12, which meshes with and is driven by the driving-gear 7. In the spur-gear 12, on diametrically opposite sides of the center of the same, are formed slots 13, in which are adjustably mounted trip devices 14. The trip devices 14 may be of any suitable construction; but, as here shown, they are preferably in the form of laterally-projecting rollers 15, which are journaled upon pins or bolts 16, the ends of which are adjustably secured in the slots 13 by means of nuts 17.

Suitably mounted upon the frame of the planter adjacent to the gear 12 is a cam-wheel 18, which is adapted to be engaged by the trip devices 14 as they are brought around by the gear 12. The shaft of the cam-wheel 18 is preferably adjustably connected to the frame of the planter by providing said frame with a slot 19, through which the end of the shaft passes, said end being provided with screw-threads to receive the clamping-nut 20, whereby the same is adjustably secured in the slot of the frame.

In the cam-wheel 18 near the periphery is formed a slot 21, in which is adjustably secured a laterally-projecting crank-pin 22, with which is attached one end of a connecting-rod 23. The opposite end of the rod 23 is pivotally connected to the end of a crank-arm 24, fixed on the valve-rod 25 of the seed-hoppers 4, which are arranged on the forward end of the planter-frame in the usual manner. The valve-rod 25 is provided with a coil-spring 25', whereby when the rod is oscillated or rocked in one direction to open the discharge-valve the same will be retracted or turned back to its normal position to close said valve in the hopper.

While I have shown and described the trip-gear 12 as provided with two tappet-rollers or trip devices, it is obvious that one of the same may be removed, thereby lessening the speed with which the cam-wheel and the parts controlled thereby are actuated, consequently increasing the distances between the points at which the seed is dropped. It is also obvious that the gear-wheel 12 may be removed and a smaller but similar constructed wheel may be supplied therefor to mesh with the driving-gear 7, thereby increasing the speed of the dropping mechanism. The frame of the planter—that is, one of the side beams—is provided with a slot 26, in which the shaft 16 of said wheel is secured, thereby permitting the same to be adjusted to bring the teeth of the same into engagement with the teeth of the driving-wheel 7. The slotted connection between the shaft of the cam-wheel 18 with the frame of the planter will permit said wheel to be adjusted to bring the same into the path of movement of the trip devices on said spur gear-wheels 12, while the adjustment of the connecting-rod 23 with the cam-wheel will permit the differences in the distances caused by the adjustment of the cam-wheel and gear 12 to be compensated for, so that all the parts may be arranged to accommodate a large or small trip gear-wheel. The slotted connection between the trip devices and the spur gear-wheel 12 permits the same to be adjusted radially thereon, which will cause the tappet-rollers to engage the cam-wheel to a greater or less degree, thus holding the valve in the seed-hoppers open for a longer or shorter time, thereby causing more or less seed to be dropped at each operation of the mechanism.

From the foregoing it will be obvious that by means of the mechanism shown and described the planter may be operated to discharge more or less seed at greater or less distances apart and the parts of the same may be quickly adjusted to produce these various results.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. A corn-planter comprising a train of gears actuated by the supporting-wheels of said planter, trip devices arranged on one of said gears, a cam-wheel adapted to be engaged by said trip devices, and means whereby said cam-wheel is connected with the valve-rod of the seed-hoppers, substantially as described.

2. A corn-planter comprising a main drive-gear loosely mounted on the axle of the planter, a clutch to connect said gear to the axle, a trip-wheel actuated by said gear, adjustable trip devices carried by said wheel, a cam-wheel operated by said trip devices, and means whereby said cam-wheel is connected with the valve-rod of the seed-hoppers, substantially as described.

3. A corn-planter comprising a main drive-gear loosely mounted on the axle of the planter, a clutch to connect said gear to the axle, a trip-wheel actuated by said gear, adjustable trip devices removably connected to said wheel, an adjustably-mounted cam-wheel operated by said trip devices and means whereby said cam-wheel is connected with the valve-rod of the seed-hoppers on the planter to intermittently actuate the valve in the same, substantially as described.

4. A corn-planter comprising a main drive-gear loosely mounted on the axle of the planter, a clutch to connect said gear to the axle, a trip-wheel actuated by said gear, adjustable trip devices removably connected to said wheel, an adjustably-mounted cam-wheel operated by said trip devices, a spring-actuated valve-rod having a crank-arm secured thereto, a connecting-rod having one end pivotally connected to said crank-arm, and means whereby the opposite end of the rod is adjustably connected to said cam-wheel, substantially as described.

5. A corn-planter comprising a main drive-gear loosely mounted on the axle of the planter, a clutch to connect said gear to the axle, a radially-slotted trip-wheel adjustably mounted on said frame, trip devices carried by said wheel, said devices consisting of pins or bolts adjustably secured in the radial slots of said trip-wheel and having mounted thereon tappet-rollers, a cam-wheel adjustably mounted on the planter-frame in the path of movement of said trip devices, a connecting-rod adjustably connected to said cam-wheel and to the seed-discharge-valve rod of the planter whereby said rod is operated to open said discharge-valves and means whereby the same are closed, substantially as described.

In testimony whereof I have hereunto set my hand in presence of two subscribing witnesses.

GEORGE W. BRUBAKER, Jr.

Witnesses:
E. C. KIPLINGER,
R. E. BYERS.